_United States Patent Office_

3,367,967
Patented Feb. 6, 1968

3,367,967
TREATMENT OF SULFONAMIDES
William G. Bauer, St. Louis, Mo., assignor to Monsanto Company, St. Louis, Mo., a corporation of Delaware
No Drawing. Filed Oct. 18, 1965, Ser. No. 497,456
10 Claims. (Cl. 260—556)

ABSTRACT OF THE DISCLOSURE

This invention relates to the use of alkali earth metal silicates to improve the color stability of aromatic sulfonamides.

---

This invention relates to a method of improving the quality of aromatic sulfonamides. More particularly, this invention relates to a method of improving the color stability of said sulfonamides suitable for use as plasticizers and intermediates.

The potential value of these aromatic sulfonamides as plasticizers in the manufacture of a wide range of resins and plastic products is often dependent upon assurance of their stability particularly with respect to the absence of coloration.

Aromatic sulfonamides are generally prepared by reacting an aromatic sulfonyl chloride with a nitrogen base such as ammonia, a primary amine or secondary amine. Substantial discoloration is found to occur in the molten crude sulfonamide during the holding period before the final refining step. Such discoloration of the sulfonamide has been found to remain after the sulfonamide has been processed through the refining step.

It is therefore an object of this invention to provide a novel method for the treatment of molten crude aromatic sulfonamides to improve the color thereof.

It is a further object to provide a method for improving the color of aromatic sulfonamides which is quick and effective but yet sufficiently inexpensive to allow its use on a commercial basis.

These and other objects will readily be understood from the ensuing description of the invention.

According to this invention, the color of molten crude aromatic sulfonamides can be greatly improved by contacting said sulfonamides with a silicate of an alkali earth metal.

The method of the invention can be conveniently carried out by mixing the melted crude aromatic sulfonamide with a small amount of an alkali earth metal silicate. After treatment, the silicate is removed by filtration. The treatment step is carried out at a temperature above the melting point of the aromatic sulfonamide and in a range up to about 20° C. above said melting point. Higher temperatures can be used in the process of this invention, but it will be apparent to one skilled in the art that the problem of color stability becomes more critical at temperatures above the aforedescribed preferred range. It is readily seen that the treatment temperature will be dependent upon the melting point of each individual sulfonamide since, for example, the melting point of p-toluene-sulfonamide is about 136–137° C. and the melting point of o-toluenesulfonamide is about 156° C. Additionally, the length of time of treatment may be varied. It will be noted from the data provided in the example that the treatment is effective over long periods of time.

The process of this invention is particularly suitable for aromatic sulfonamides obtained by the reaction of an aromatic sulfonyl halide and a nitrogen base having at least one replaceable hydrogen atom attached to a nitrogen atom thereof. Typical sulfonamides of aromatic sulfonyl halides encompassed by the invention include p-toluenesulfonamide, o - toluenesulfonamide, N - ethyl-p-toluenesulfonamide, N - butyl-p-toluenesulfonamide, N-cyclohexyl - p-toluenesulfonamide, N-cyclohexylbenzenesulfonamide, N - hydroxybenzenesulfonamide, N-phenyl-N - hydroxybenzenesulfonamide, $\beta$-hydroxy-ethyl-p-toluenesulfonamide, 2 - chloro - 5-nitrobenzenesulfonamide, mixtures of o- and p-toluenesulfonamide, N,N-dipropyl-p - toluenesulfonamide, N,N-dicyclohexyl-p-toluenesulfonamide, N,N-di-n-propyl-p-cyanobenzenesulfonamide and the like.

Aromatic sulfonyl halides which have been employed in amidations reactions include the sulfonyl bromides, sulfonyl chlorides, sulfonyl iodides and sulfonyl fluorides. However, in the preparation of aromatic sulfonamides the aromatic sulfonyl chloride is preferred and includes benzenesulfonyl chloride, substituted benzenesulfonyl chlorides such as 2-chloro-5-nitrobenzenesulfonyl chloride, p-cyanobenzenesulfonyl chloride and the like; toluenesulfonyl chlorides such as o-toluenesulfonyl chloride, p-toluenesulfonyl chloride, mixtures of o- and p-toluenesulfonyl chloride and the like.

The nitrogen base reactants employed in the preparation of the sulfonamides include ammonia, as well as any of the primary or secondary amines. These amines include mono- and dialkylamines such as ethylamine, butylamine, dipropylamines and the like; mono- and dicycloalkylamines such as cyclohexylamine and dicyclohexylamine and the like; aryl amines such as aniline, diphenylamine, the phenylene amines, the naphthylamines and toluidines; heterocyclic amines such as morpholine; hydroxylamine; amino alcohols such as mono- and diethanolamine, mono- and dipropanolamine and the like.

The amount of alkali earth metal silicate employed can be varied; however, for efficient treatment amounts varying from about 0.5% to about 1.5% by weight based on the weight of the amide will provide excellent results. A significant improvement in color characteristics can be effected, however, by the use of small amounts of at least 0.1%. Much larger amounts as high as 5.0% can be used but are generally not needed, and the use of such amounts is therefore wasteful.

The silicate materials which can be employed in this invention may be selected from naturally occurring and synthetic silicate materials.

The term "synthetic silicates" is meant to include the barium and calcium silicates. A preferred synthetic alkali earth metal silicate which has been found to give satisfactory results is calcium silicate (Micro-Cel "C," Micro-Cel "E" and Micro-Cel "T–13") prepared by hydrothermal reaction of diatomite and lime. Synthetic barium silicate (Bar-O-Sil) can also be used in the process of this invention.

The naturally occuring silicates such as wollastonite are described in "The Colloid Chemistry of Silicate Minerals," Academic Press, New York, 1949, by C. E. Marshall.

The following examples illustrate the advantageous and unexpected results which are achieved by use of the treating agents of this invention, but it is not intended that this invention be limited by or to the examples. Parts are parts by weight unless otherwise stated. The colors for the following examples were determined by visual comparison of APHA standards with a 33⅓% solution of the sulfonamide and 66⅔% acetone with solids removed.

Example 1

In this control example, a suitable reaction vessel having means for the addition and removal of liquids and solids, means for agitating the vessel contents, means for heating and cooling the vessel contents and means for measuring the temperature of liquids in the vessel, there was charged 700 grams of crude p-toluenesulfonamide, obtained from the reaction of p-toluenesulfonyl chloride and ammonia, having an APHA color of 25. The crude sulfonamide was agitated for ninety-six hours during which time the temperature of the sulfonamide was maintained at 145° C. The APHA color of the molten sulfonamide was determined at 24 hour intervals. The results observed are given in Table I.

*Example 2*

In a suitable reaction vessel there was charged 700 grams of crude p-toluenesulfonamide, obtained from the reaction of p-toluenesulfonyl chloride and ammonia, having an APHA color of 25. There were added 7.0 grams of Micro-Cel "C" and the resulting mixture was agitated for ninety-six hours during which time the temperature of the mixture was maintained at 145° C. The APHA color of the molten sulfonamide was determined at 24 hour intervals. The results observed are given in Table I.

*Examples 3–10*

Following the procedure of Example 2, crude p-toluenesulfonamide is treated by alkali earth metal silicates as summarized in Table I.

TABLE I

| Example No. | Treating Agent | Percent Treating Agent | Color, APHA After Treatment For— | | | | | | | | | | |
|---|---|---|---|---|---|---|---|---|---|---|---|---|---|
| | | | 0 hrs. | 24 hrs. | 48 hrs. | 72 hrs. | 96 hrs. | 120 hrs. | 144 hrs. | 168 hrs. | 192 hrs. | 216 hrs. | 240 hrs. |
| 1 | None | | 25 | 45 | 125 | 165 | 200 | | | | | | |
| 2 | Micro-Cel "C" | 1.0 | 25 | 25 | 25 | 25 | 50 | | | | | | |
| 3 | None | | 40 | 80 | 100 | 110 | 130 | | | | | | |
| 4 | Micro-Cel "C" | 1.0 | 40 | 45 | 45 | 35 | 35 | | | | | | |
| 5 | Micro-Cel "T-13" | 1.0 | 40 | 45 | 45 | 45 | 45 | | | | | | |
| 6 | ---do--- | 2.0 | 40 | 40 | 45 | 45 | 40 | | 35 | 45 | 50 | 60 | 70 |
| 7 | None | | 125 | 250 | 300 | 300 | 350 | 375 | 375 | 400 | | | 500 |
| 8 | Micro-Cel "T-13" | 1.0 | 125 | 60 | 70 | 70 | 70 | 60 | 70 | 70 | 80 | 80 | 80 |
| 9 | None | | 70 | 90 | 90 | 90 | 175 | | | | | | |
| 10 | Bar-O-Sil | 1.0 | 20 | 20 | 50 | | | | | | | | |

In a manner similar to the procedure of Example 1, striking improvement in the color stability is obtained in aromatic sulfonamides such as o-Toluenesulfonamide,
N-ethyl-p-toluenesulfonamide,
N-butyl-p-toluenesulfonamide,
N-cyclohexyl-p-toluenesulfonamide,
N-cyclohexylbenzenesulfonamide,
N-hydroxybenzenesulfonamide,
N-phenyl-N-hydroxybenzenesulfonamide,
β-hydroxyethyl-p-toluenesulfonamide,
2-chloro-5-nitrobenzenesulfonamide,
Mixtures of o- and p-toluenesulfonamide,
N,N-dipropyl-p-toluenesulfonamide,
N,N-dicyclohexyl-p-toluenesulfonamide,
N,N-di-n-propyl-p-cyanobenzenesulfonamide and the like.

From the foregoing results it is evident that the color stability of molten aromatic sulfonamide prepared from the aforedescribed aromatic sulfonyl chlorides can be significantly improved by treatment with an alkali earth metal silicate.

While this invention has been described with respect to certain embodiments, it is not so limited, and it is to be understood that variations and modifications thereof which are obvious to those skilled in the art may be made without departing from the spirit or scope of this invention.

The embodiments of the invention in which an exclusive property or privilege is claimed are defined as follows:

1. A process which comprises contacting an aromatic sulfonamide, prepared by the reaction of an aromatic sulfonyl chloride selected from the group consisting of benzenesulfonyl chloride, a substituted benzenesulfonyl chloride selected from the group consisting of 2-chloro-5-nitrobenzenesulfonyl chloride and p-cyanobenzenesulfonyl chloride, o-toluenesulfonyl chloride and p-toluene sulfonyl chloride with a nitrogen base having at least one replaceable hydrogen atom attached to a nitrogen atom thereof selected from the group consisting of ammonia, a mono (lower)alkylamine, a di(lower)alkylamine, cyclohexylamine, dicyclohexylamine, aniline, diphenylamine, phenylene amine, naphthylamine, toluidine, morpholine, hydroxylamine, a lower alkanolamine and a di(lower)alkanolamine, at a temperature above the melting point of the sulfonamide with an alkali earth metal silicate selected from the group consisting of barium silicate and calcium silicate in amounts of from about 0.1% to about 5% by weight of the sulfonamide.

2. A process which comprises contacting an aromatic sulfonamide, prepared by the reaction of an aromatic sulfonyl chloride selected from the group consisting of benzenesulfonyl chloride, a substituted benzenesulfonyl chloride selected from the group consisting of 2-chloro-5-nitrobenzenesulfonyl chloride and p-cyanobenzenesulfonyl chloride, o-toluenesulfonyl chloride and p-toluenesulfonyl chloride with a nitrogen base having at least one replaceable hydrogen atom attached to a nitrogen atom thereof selected from the group consisting of ammonia, a mono (lower)alkylamine, a di(lower)alkylamine, cyclohexylamine, dicyclohexylamine, aniline, diphenylamine, phenylene amine, naphthylamine, toluidine, morpholine, hydroxylamine, a lower alkanolamine and a di(lower)alkanolamine, at a temperature above the melting point of the sulfonamide with an alkali earth metal silicate selected from the group consisting of barium silicate and calcium silicate in amounts of from about 0.5% to about 1.5% by weight of the sulfonamide.

3. A process which comprises contacting p-toluenesulfonamide at a temperature above the melting point of the sulfonamide with calcium silicate in amounts of from about .5% to about 1.5% by weight of the sulfonamide.

4. A process which comprises contacting p-toluenesulfonamide at a temperature above the melting point of the sulfonamide with barium silicate in amounts of from about 0.5% to about 1.5% by weight of the sulfonamide.

5. A process which comprises contacting o-toluenesulfonamide at a temperature above the melting point of the sulfonamide with calcium silicate in amounts of from about .5% to about 1.5% by weight of the sulfonamide.

6. A process which comprises o-toluenesulfonamide at a temperature above the melting point of the sulfonamide with barium silicate in amounts of from about 0.5% to about 1.5% by weight of the sulfonamide.

7. A process which comprises contacting N-ethyl-p-toluenesulfonamide at a temperature above the melting point of the sulfonamide with calcium silicate in amounts of from about .5% to about 1.5% by weight of the sulfonamide.

8. A process which comprises contacting N-cyclohexyl-p-toluenesulfonamide at a temperature above the melting point of the sulfonamide with calcium silicate in amounts of from about .5% to about 1.5% by weight of the sulfonamide.

9. A process which comprises contacting crude N-cyclohexylbenzenesulfonamide at a temperature above the melting point of the sulfonamide with calcium silicate in amounts of from about .5% to about 1.5% by weight of the sulfonamide.

10. A process which comprises contacting N,N-dipropyl-p-toluenesulfonamide at a temperature above the melting point of the sulfonamide with calicum silicate in amounts of from about .5% to about 1.5% by weight of the sulfonamide.

References Cited

UNITED STATES PATENTS

| 2,236,825 | 4/1941 | Mares | 260—556 |
| 2,115,716 | 5/1938 | Hansen | 260—556 |
| 2,499,932 | 3/1950 | Sido | 260—556 |

NORMA S. MILESTONE, *Acting Primary Examiner.*

H. MOATZ, *Assistant Examiner.*